(12) United States Patent
Schuffenhauer et al.

(10) Patent No.: US 7,168,512 B2
(45) Date of Patent: Jan. 30, 2007

(54) CUTTING INSERT AND MILLING CUTTER WITH SUCH A CUTTING INSERT

(75) Inventors: Michael Schuffenhauer, Fürth (DE); Steffen Kranz, Fürth (DE); Werner Boguth, Puschendorf (DE)

(73) Assignee: Kennametal Inc., Latrobe, PA (US)

( * ) Notice: Subject to any disclaimer, the term of this patent is extended or adjusted under 35 U.S.C. 154(b) by 207 days.

(21) Appl. No.: 10/795,139

(22) Filed: Mar. 5, 2004

(65) Prior Publication Data
US 2005/0023044 A1 Feb. 3, 2005

Related U.S. Application Data

(63) Continuation-in-part of application No. PCT/EP02/09938, filed on Sep. 5, 2002.

(30) Foreign Application Priority Data

Sep. 6, 2001 (DE) .......................... 201 14 783 U

(51) Int. Cl.
*E21B 10/633* (2006.01)
*E21B 10/43* (2006.01)
*B26D 1/12* (2006.01)

(52) U.S. Cl. .......................... 175/426; 407/42; 407/62; D15/139

(58) Field of Classification Search ................ 175/426, 175/428, 430, 420.01; 407/42, 60–62, 113–115; D15/139
See application file for complete search history.

(56) References Cited

U.S. PATENT DOCUMENTS

| 4,294,565 | A | * | 10/1981 | Erkfritz | ...................... 407/113 |
|---|---|---|---|---|---|
| 5,256,009 | A | | 10/1993 | Stoffels | |
| 5,368,418 | A | * | 11/1994 | Bentjens et al. | ............. 407/114 |
| 5,443,335 | A | * | 8/1995 | Shimano et al. | ............. 407/113 |
| 5,513,931 | A | * | 5/1996 | Reiterman et al. | ........... 407/113 |
| 5,791,831 | A | * | 8/1998 | Shimano et al. | ............. 407/113 |
| 6,802,676 | B2 | * | 10/2004 | Noggle | ........................ 407/113 |

FOREIGN PATENT DOCUMENTS

| DE | 44 01 326 | 7/1994 |
|---|---|---|
| DE | 44 46 824 | 6/1995 |
| EP | 0 370 494 | 5/1990 |
| FR | 2 364 724 | 4/1978 |

* cited by examiner

*Primary Examiner*—Kenneth Thompson
(74) *Attorney, Agent, or Firm*—Nils H. Ljungman & Associates

(57) ABSTRACT

A cutting insert 1, 1', comprising opposite insert planes E1, E2 of a base 2 of one base area 3 wherein a conical surface section 4a of a lateral face 4 and the base area 3 facing the same form an acute angle alpha while forming a cutting edge 5, while a planar surface section 4b of the same lateral face 4 forms an obtuse angle beta with the opposite base area 3. The cone axis 6 of the conical surface area 4a lying in the insert plane E1, E2 runs off-set in parallel to the center insert axis 7 lying in the same insert plane E1, E2 while forming an off-center arcuate profile of the cutting edge 5. A milling cutter 17 comprising a number of such cutting inserts 1, 1' is characterized in that a cutting insert 1, 1' preferably disposed on the periphery of the center line M of a tool support 16 is off-set from the center line M by an angle phi equal to 5±3 degrees.

18 Claims, 7 Drawing Sheets

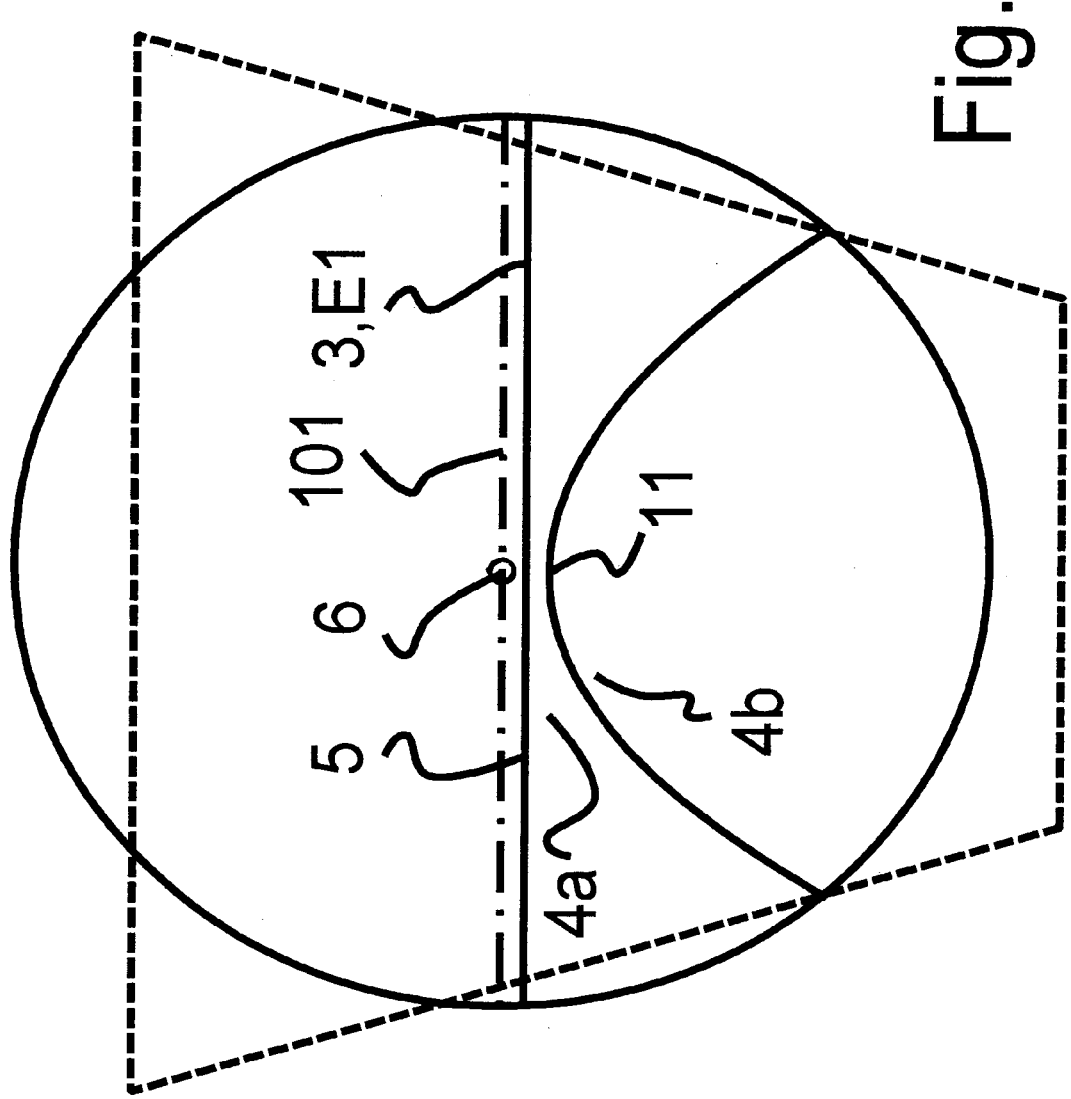

US 7,168,512 B2

CUTTING INSERT AND MILLING CUTTER WITH SUCH A CUTTING INSERT

CONTINUING APPLICATION DATA

This application is a Continuation-In-Part application of International Patent Application No. PCT/EP02/09938, filed on Sep. 5, 2002, which claims priority from Federal Republic of Germany Patent Application No. 201 14 783.1, filed on Sep. 6, 2001. International Patent Application No. PCT/EP02/09938 was pending as of the filing date of this application. The United States was an elected state in International Patent Application No. PCT/EP02/09938.

BACKGROUND

1. Technical Field

This application relates to a cutting insert having opposite plate planes of a base body with respectively one base surface for each plane, as well as at least one lateral surface. This application relates furthermore to a milling cutter with such a cutting insert. The term cutting insert is particularly to mean an indexable cutting insert and the term milling cutter is particularly to mean a milling cutter for producing or machining finished surfaces.

2. Background Information

Due to the increasing demands made of technical components or work pieces that are made by chip-forming machining, there arises particularly the demand for an improved quality of the surface finish. So as to meet this demand for smooth surfaces without furrows and grooves, and for finish-machining surfaces, particularly with a roughness (Rz) of less than 6 μm and a waviness ($W_t$) of less than 3 μm, there are also to be made special demands of the tools that are being used. Of particular importance herein are the geometry of the cutting edge, the selection of the cutting material, and the selection of the treatment parameters, as well as the exactly defined position of the cutting edge with respect to the surface that is being machined.

In such a milling cutter, particularly in a so-called finish-machining milling cutter, for the generation of particularly smooth surfaces, the usually used cutting inserts or indexable cutting inserts comprise essentially two opposite base surfaces that are utilized respectively as support surfaces and as clear surfaces for the main cutting edge. Four planar surfaces are arranged at the periphery, which surfaces are utilized when installed in the tool as contact surfaces and as chip surfaces for the main cutting edge that is used in the cutting contact. For the secondary cutting edge that is also in cutting contact, these planar surfaces serve respectively as secondary cutting surfaces.

Concerning the cutting edge that forms the main cutting edge, this can be linear and essentially plane-parallel with respect to the surface that is being machined. Of disadvantage are hereby the sensitivity with regard to angle errors during positioning of this linear cutting edge with respect to the work piece surface, such that a preferred approach that resides in use of only an end portion of the cutting edge at the surface that is to be machined is practically unavoidable and, accordingly, the posed requirement of an improved surface finish is practically not attainable.

As an alternative to a linear configuration and thereby a straight cutting edge, the cutting edge may comprise a circular or ellipsoidal curvature. In a cutting insert known from EP 0 370 494 B1, the curvature increases uniformly from the center of the cutting edge in the direction to the two cutting edge ends. Such a cutting edge that is circular or ellipsoidal in reference to the surface to be machined, however, due to values of curvature that are uniform or uniformly increasing commencing from the center of the cutting edge in the direction of the two cutting edge ends, entails undesirable small errors of tolerances with reference to angle errors with a cutting body radius that is increasing. In the case of a cutting edge that is configured to be circularly curved, furthermore, the diminishing of surface quality with a decrease in the radius of the cutting edge is of particular detriment.

Concerning the positioning of such a cutting insert or indexable cutting insert in the carrier system, there exist as a matter of principle two possibilities. Thus, the cutting insert or the indexable cutting insert, under unchanging positioning of the cutting edge with respect to the surface, can be fixed in the carrier or it can be connected thereto in such a way that a subsequent shifting of the position of the cutting edge, in reference to the surface that is to be machined, is possible. Of disadvantage in such position fixing of the cutting insert with an unchanging cutting edge position is the requirement of a very precise tool carrier for the cutting insert. Pursuantly, in the case of a cutting insert connection with a subsequent shift in position of the cutting edge, an increased susceptibility of the entire system with respect to shifting of the position of the cutting edge by external circumstances is of disadvantage.

OBJECT OR OBJECTS

One possible object is to propose a cutting insert, particularly an indexable cutting insert, that permits, while avoiding the mentioned disadvantages, generation of a high quality surface finish of the work piece that is to be machined. Furthermore, a milling cutter, particularly a finish-machining cutter with such a cutting insert, is proposed that achieve a waviness depth or a profile depth in the work piece that is to be machined that is as low as possible, and thus achieves a particularly smooth surface quality of the surface that is to be machined.

SUMMARY

Concerning the cutting insert, the mentioned object is acheived by a cutting insert having opposite plate planes of a base body with respectively one base surface for each plane, as well as at least one lateral surface that has a cone-mantel-shaped surface portion and a planar surface portion, whereby the cone-mantel-shaped surface portion and the base surface that is facing this portion are disposed with respect to one another to form a cutting edge and at an acute angle, whereby the planar surface portion and the opposite base surface are disposed at an obtuse angle with respect to one another, and whereby the cone axis that is disposed in the plate plane of the cone-mantel-shaped surface portion extends in offset-parallel relationship with respect to the central axis that is disposed in the same plate plane with there being formed an off-center, curved portion of the cutting edge. For this, the cutting insert comprises at least one lateral surface with one conically shaped surface portion and with one planar surface portion. The conically shaped, or cone-mantel-shaped, surface portion and the base surface that is facing it are, while forming a cutting edge, disposed at an acute angle with respect to one another, while the planar surface portion forms an obtuse angle with the opposite base surface. The cone-mantel-shaped surface portion rises in a bulge asymmetrically from the lateral surface, while forming an off-center curved course of the cutting edge, in that the cone axis of the cone-mantle-shaped surface portion that is disposed in the plate plane and, accordingly, in the plane of the base surface, is parallel offset to the central plate axis that is disposed in the same plate plane. In other words, the axis of the cone-mantle-shaped surface portion is offset with respect to the central axis of the cutting insert.

The section of the cone generated by this off-center bulged surface portion represents, in reference to the surface that is to be machined, an ellipse having two cutting edge segments of uneven lengths, respectively measured from the axis of the cone to the one or, respectively, to the other end of the cutting edge. In reference to the surface that is to be machined, accordingly, the meeting point—and accordingly the summit point of the elliptical cutting edge—of the two segments is the highest point. The summit point is disposed in this exactly below the cone axis that extends in the plate plane, i.e., in the plane of the base surface, of the cone-mantle-shaped surface portion or cone-mantle-surface. Thereby, the radius of curvature in reference to the length of the arc of the cutting edge is very large, i.e., practically not discernable. The course of the arc of the cutting edge, suitably, is disposed for this in the plane of the base surface.

In at least one other possible embodiment, the cone axis lies in a plane that is parallel to the nearest plate plane of the cutting insert, but which plane is disposed above and a distance away from the plate plane. The cone axis is parallel and disposed offset with respect to the center axis of the cutting insert. The summit point of the curve defined by the planar surface is directly below the cone axis in a plane perpendicular to the plane of the cone axis. The cutting edge formed at the end of the base surface is a portion of a hyperbola in shape and has two cutting edge sections that are of different lengths as a result of the offset of the cone axis with respect to the center axis of the cutting insert. The conical surface portion forms an acute angle with respect to the base surface adjacent the cone axis. The conical surface portion forms an obtuse angle with respect to the opposite base surface.

In at least one other possible embodiment, the cone axis could possibly be disposed at an angle with respect to the plate plane and center axis of the cutting insert. In this manner, the cutting edge and the edge of the planar surface portion could each possibly be in the shape of a portion of an ellipse, a hyperbola, or a parabola.

In at least one other possible embodiment, the cone axis could possibly be perpendicular to the center axis of the cutting insert. The cutting edge could then possibly be in the shape of a portion of an ellipse, a hyperbola, or a parabola, depending on the orientation of the cone axis with respect to the center axis.

A cutting insert, the chip face of which comprises a convexly curved surface portion and a planar surface portion as such is known from DE 44 46 824 A1. There the curvature of the convex surface portion, in contrast to the inventive cutting insert, is adjusted in such a way that the distance between the cutting edge and an imaginary line that connects the end points of the cutting edge, is greatest at the center of the cutting edge. Expressed differently, the cutting edge, with respect to its end points, is somewhat symmetrically curved. The curved cutting edge of the known cutting insert serves, furthermore, not to generate a smooth work piece surface, inasmuch as the known cutting insert is disposed at the periphery of a milling cutter and the main cutting edge, accordingly, is not aligned in parallel to the planar surface of the work piece. A short secondary cutting edge serves in smoothing of the work piece surface in the known cutting insert.

In an advantageous embodiment, the cutting insert has at least one edge chamfer surface that most suitably is shaped like a wedge. This forms, with the conically shaped surface portion and with the planar surface portion and with the base surface that is facing away from the cutting edge, respectively an obtuse angle. By means of such wedge-shaped edge chamfer surface, advantageously, on the one hand, a soft initial cut is attained and, on the other hand, a shortening of the oppositely disposed cutting edge is precluded.

In a further advantageous embodiment, the conically shaped surface portion and the planar surface portion are disposed under different angles, whereby a cutting edge that is produced by these two surface portions, at its summit point is inclined towards the cutting edge.

In a rather advantageous embodiment of the invention, the cutting insert is configured as an indexable cutting insert that comprises four of such lateral surfaces, whereby the cone-mantle-shaped surface portion as well as the planar surface portion of respectively oppositely disposed lateral surfaces are inclined towards one another, i.e., have a mutual inclination towards one another.

In such an indexable cutting insert, advantageously, respectively two edge chamfer surfaces, symmetrically disposed at or on each base surface, are provided. Thereby, each edge chamfer surface forms with one of the base surfaces and one of the lateral surfaces respectively an obtuse angle, while this edge chamfer surface is disposed to the cone-mantle-shaped surface portion of the adjacent lateral surface, while forming an ellipsoidal edge, under an acute angle.

The indexable cutting insert is characterized furthermore by a rhombus-shaped base body, with the base surfaces that are oppositely disposed with respect to one another being turned with respect to one another by an angle of (97±2) degrees, preferably 97 degrees.

The milling cutter in accordance with the invention has a number of such cutting inserts that are disposed in distributed manner at the circumference of a tool holder in the region of the finish-machining cutting head. The preferably two-sided indexable cutting elements are in this connected to the tool holder in such a way that the cutting edge of the respective cutting insert is fixed in a predetermined position, thus, a subsequent shifting of the cutting edge is essentially rendered impossible. In this it is preferable that the cutting insert that is provided at the periphery at the 0 degree center line of the tool holder, is offset with respect to this center line by an angle of (5±3) degrees.

In a further advantageous embodiment of the milling cutter, each plate seat provided for a cutting insert in the tool holder comprises, in addition to a support surface that is facing a corresponding base surface of the cutting insert and a contact surface that is facing a corresponding lateral surface of the cutting index, a take-up or receiving opening for take-up or receiving of an abutment pin that serves as axial abutment for the cutting insert. Since this abutment pin is not mounted until after the production of the plate seat, the support surface and the contact surface of the plate seat can be machined simultaneously in one operating step. This makes it possible that a precision of the planar extent of 10 μm can be achieved.

The advantages obtained with the invention reside primarily therein that particularly due to the combination of the off-centered bulge of the conically shaped surface portion of the respective lateral surface of the cutting insert—and with this, due to the bulged cutting edge with a decentralized disposed maximum of a bulge or summit point—as well as the arrangement of the cutting insert within the tool holder anteriorly of its 0 degree center line, due to a thereby caused increased radius, serves to achieve a particularly high surface finish quality of the surface of a work piece that is to be machined. Particularly, with such a tool, used as a finish-machining milling cutter, remaining waviness depths or profile depths are achievable that are lower by a factor of 2 as compared to hitherto known finish-machining milling cutters for machining work piece surfaces.

The above-discussed embodiments of the present invention will be described further hereinbelow. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

In the following, embodiment examples are described with reference to the drawings.

FIG. 11 shows a top view of a cone similar to the cone shown in FIG. 10 according to one possible embodiment.

Corresponding parts in all figures are provided with the same reference symbol.

DESCRIPTION OF EMBODIMENT OR EMBODIMENTS

Figure 1:
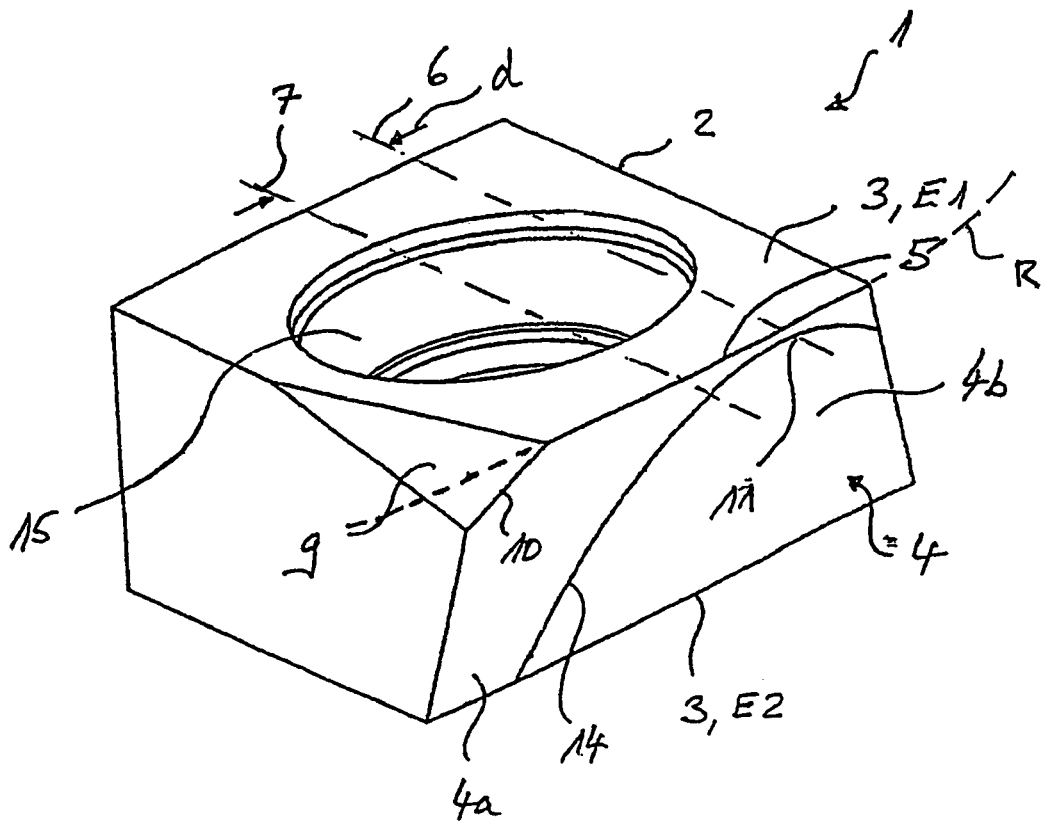
FIG. 1, in perspective illustration, shows a cutting insert according to one possible embodiment with a lateral surface that comprises an asymmetrical conically shaped surface portion and a planar surface portion, FIG. 2, in an illustration according to FIG. 1, shows a cutting insert that is configured as an indexable cutting insert with four of such lateral surfaces.
Figure 4:
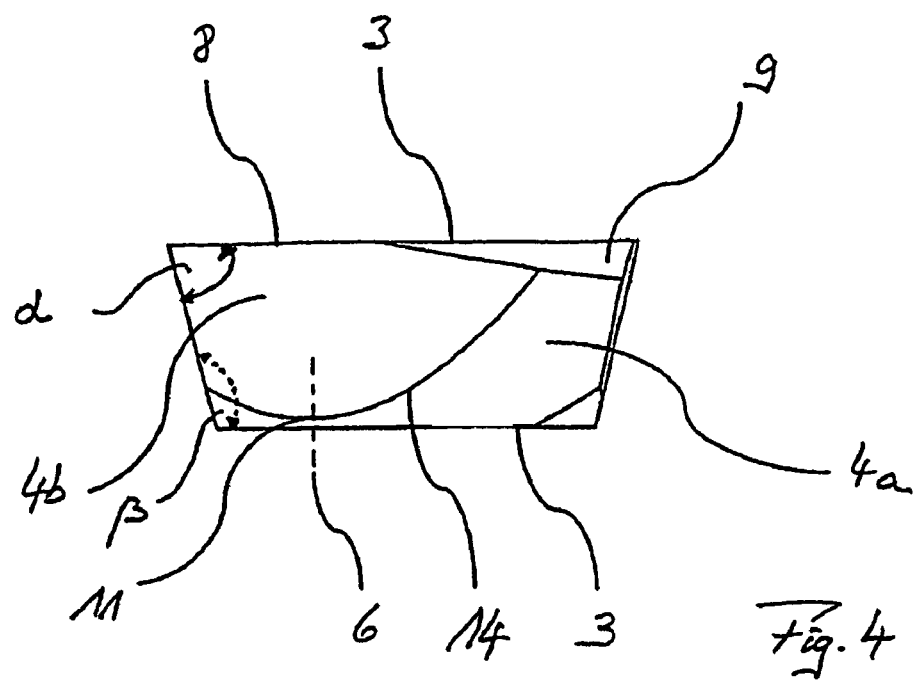
FIG. 4 shows the cutting insert in a side view, FIG. 5, in perspective illustration, shows a milling cutter with a plurality of such cutting inserts.

The cutting insert 1 illustrated in FIG. 1 comprises a base body 2 with two base surfaces 3 that are disposed in plate planes E1 and E2 that are disposed oppositely with respect to one another. The cutting insert 1 also comprises a lateral surface 4 with a cone-mantle-shaped surface portion 4a and a planar surface portion 4b. The cone-mantle-shaped surface portion 4a, as well as the base surface 3 that is facing it are disposed with respect to one another under an acute angle α (FIG. 4) and form a cutting edge 5. The planar surface portion 4b is disposed at an obtuse angle β (FIG. 4 with the oppositely disposed base surface 3.

The cutting edge 5 has a curved or arcuate course with a very large radius of curvature, R, that is disposed within the plane E1 of the base surface 3, with off-centered—and, accordingly, asymmetrical—bulging of the cone-mantle-shaped surface portion 4a. Thereby, the cone axis 6 that is disposed in the plate plane E1 of the cone-mantle-shaped surface portion 4a, while forming the off-centered arcuate course of the cutting edge 5 at a distance d that is parallel off-set to the central plate axis 7 that is disposed in the same plate plane E1.

Figure 2:
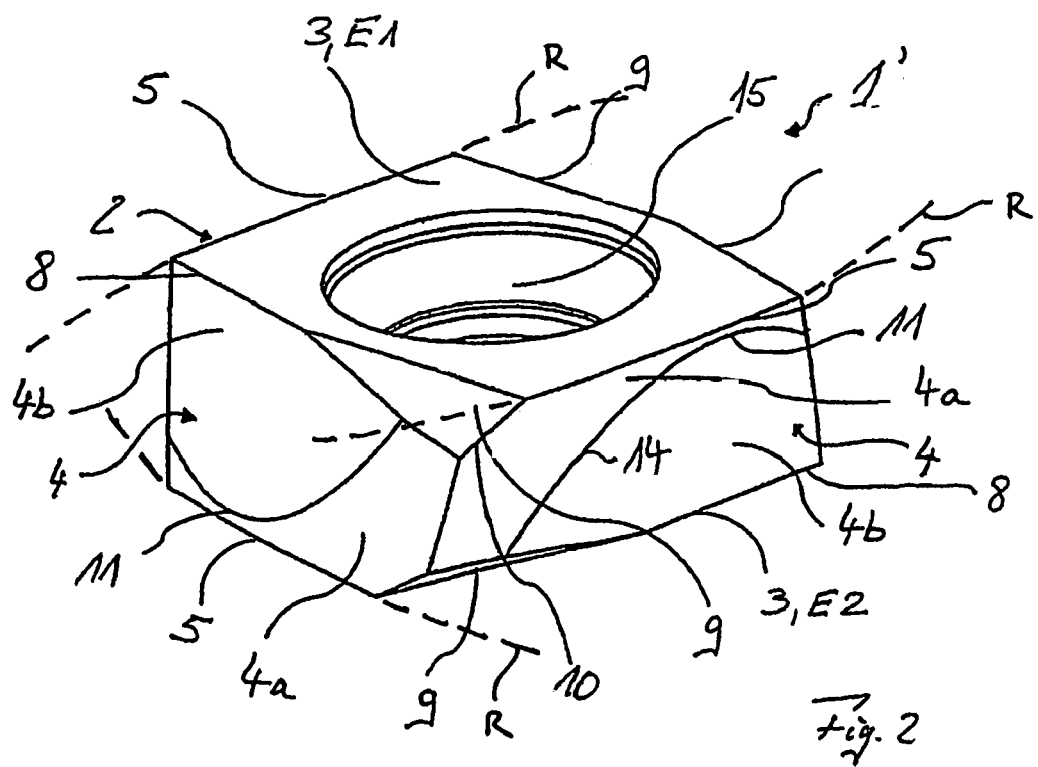

FIG. 2 illustrates a cutting insert that is effective as indexable cutting insert or reversible cutting insert 1', that has four such lateral surfaces 4, of which lateral surfaces 4 only two can be viewed. The indexable cutting insert 1' comprises a rhombus-shaped base boy 2 with four cutting edges 5. In this, the geometric configuration and the dimensions of the two base surfaces 3 are at least most nearly identical, but turned by 97 degrees with respect to one another. The indexable cutting insert 1', accordingly, has four planar surface portions 4b and four cone-mantle-shaped surface portions or cone-mantle surfaces 4a. Respectively one planar surface portion 4b and a cone-mantle-shaped surface portion 4a configure thereby a lateral surface 4 of the base body 2. Respectively oppositely disposed cone-mantle-shaped surface portions 4a configure an acute angle α (FIG. 4) with one of the base surfaces 3. The thus resulting cone sections comprise the cutting edges 5, that, accordingly, are also disposed to be oppositely disposed with respect to one another. With the respectively other base surface 3, the cone-mantle-shaped surface portions 4a do not form a cutting line. Thus, for each base surface 3 there are respectively present two cutting edges 5.

The respectively oppositely disposed planar surface portions 4b of the lateral surfaces 4 configure, with the base surface 3, an obtuse angle β (FIG. 4), whereby the thus resulting edge 8 is not a cutting edge. With the respectively other base surface 3, these planar surface portions 4b have no common edge. As is particularly evident from FIG. 4, the respectively oppositely disposed planar surface portions 4b and the oppositely disposed cone-mantle-shaped surface portions 4a of the respective lateral surface 4 are inclined with respect to one another.

Whereas the cutting insert 1 according to FIG. 1 has an edge chamfer surface 9, in the indexable cutting insert 1' according to FIG. 2, there are present four of such edge chamfer surfaces 9. Thereby, respectively two of these edge chamfer surfaces 9, distributed symmetrically, are arranged to each base surface 3. The edge chamfer surface 9 is respectively disposed, as if under pressure, between a base surface 3 and a planar surface portion 4b. The respective edge chamfer surface 9 forms with the base surface 3, as well as with a cone-mantle-shaped surface portion 4a and a planar surface portion 4b, an obtuse angle, whereas these edge chamfer surfaces 9 form an acute angle with another, not oppositely disposed cone-mantle-shaped surface portion 4a. An edge 10 that is hereby produced is shaped like an ellipsoid and is used particularly in edge or commencement cutting phases.

Figure 3:
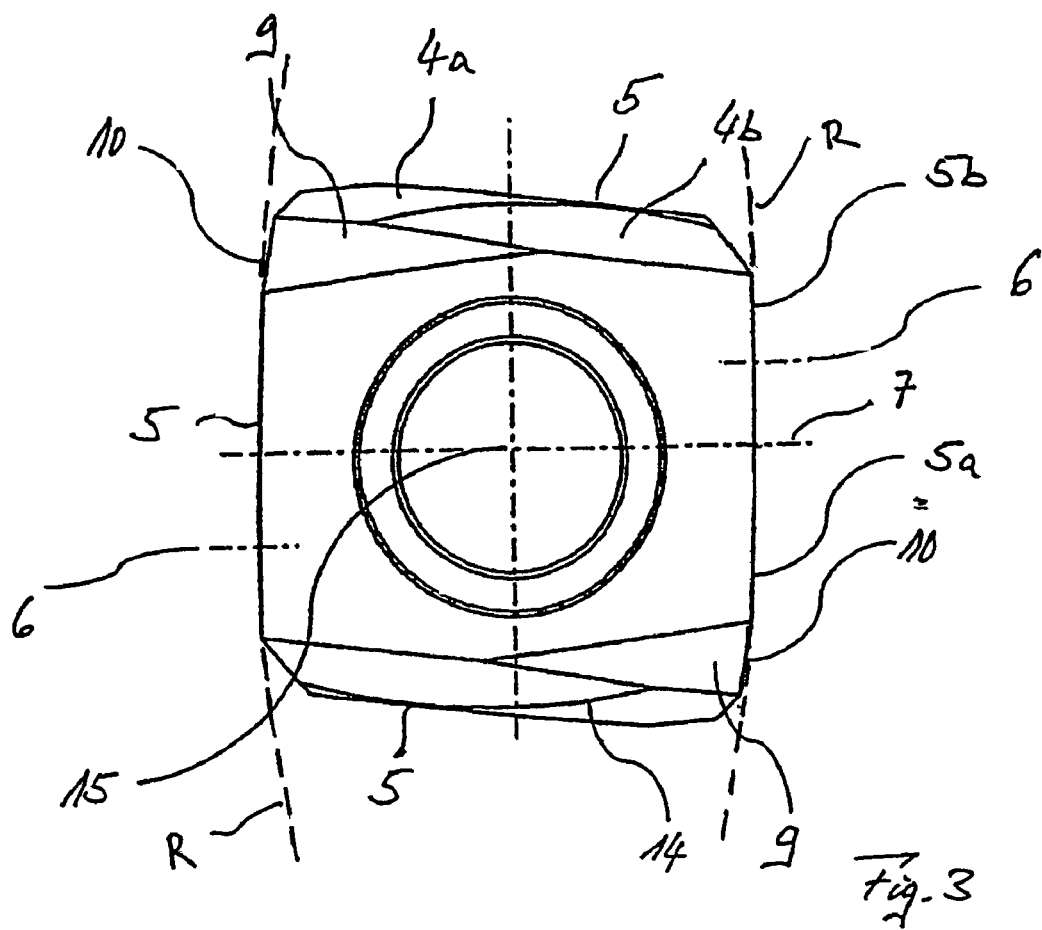
FIG. 3 shows a cutting insert according to FIG. 2 in top plan view.

As is clear for comparison from FIG. 3, also in the two-sided indexable cutting insert 1', the respective cone axis 6 is offset with respect to the central plate axis 7 of the indexable cutting insert 1'. The thus resultant cone section, represents, in reference to the surface of the work piece that is to be machined, an ellipse having edge segments 5a and 5b of a cutting edge 5, which segments are of uneven lengths. In reference to the surface to be machined, the meeting point of the two edge segments 5a, 5b that is disposed at the summit point 11 (FIGS. 1 and 2) is the highest point, whereby the summit point 11 is disposed beneath the cone axis 6 that extends in the respective plate plane E1, E2 of the base surface 3 (FIG. 1). Due to the very large radius of curvature, R, in reference to the length of arc of the cutting edge 5, this curved course of the cutting edge 5 or, respectively, the curvature of the cutting edge, is practically not viewable in the illustrations.

The cone-mantle-shaped surface portions 4a and the planar surface portion 4b of each lateral surface 4 of the indexable cutting insert 1' are furthermore disposed under different angles. Hereby the difference of the angles is selected in such a way that the edge-of-cut 14 (FIG. 4) that results by intersection of the two surface portions 4a, 4b, is facing together with the summit point 11 of the edge 14, towards the corresponding cutting edge 5.

Another feature of the indexable cutting insert 1' resides in the differing inclination of the peripherally arranged cone-mantle-shaped surface portions 4a on the one hand and the planar surface portion 4b that is also disposed at the periphery, on the other hand, with respect to the corresponding base surface 3. Thereby altogether by way of the negative angle of inclination δ, a particularly soft commencement behavior is produced and the radial chip removal is enhanced. Furthermore, the configuration of the cutting edge 5 of the two-sided indexable cutting insert 1' is optimally adapted to the described geometrical requirements with respect to adjusting angle γ and the angle of inclination δ such that in the event of a deviation of the parameters from the mentioned values one would expect a worsening of the surface finish and of the surface parameters of the surface O that is to be machined.

At the center of the cutting insert 1 or, respectively, the indexable cutting insert 1', there is provided a fully penetrating circular opening 15 that serves to achieve a particularly simple mounting in a tool holder 16 (FIG. 5) by way of a clamping bolt securement or screw securement. The configuration of the base body 2 thus provides a cutting insert or indexable cutting insert 1 or, respectively, 1', that meets the requirements of a particularly smooth and particularly furrow-free and groove-free, surface.

The configuration of the outer shape of the cutting insert 1, 1' in the illustrated shape ensures linear contacting between the cutting insert 1, 1' and the plate seat support surfaces of the tool holder 16 of a milling cutter or finish-machining milling cutter 17 that is further described with reference to the following FIGS. 5 to 9.

Figure 5:
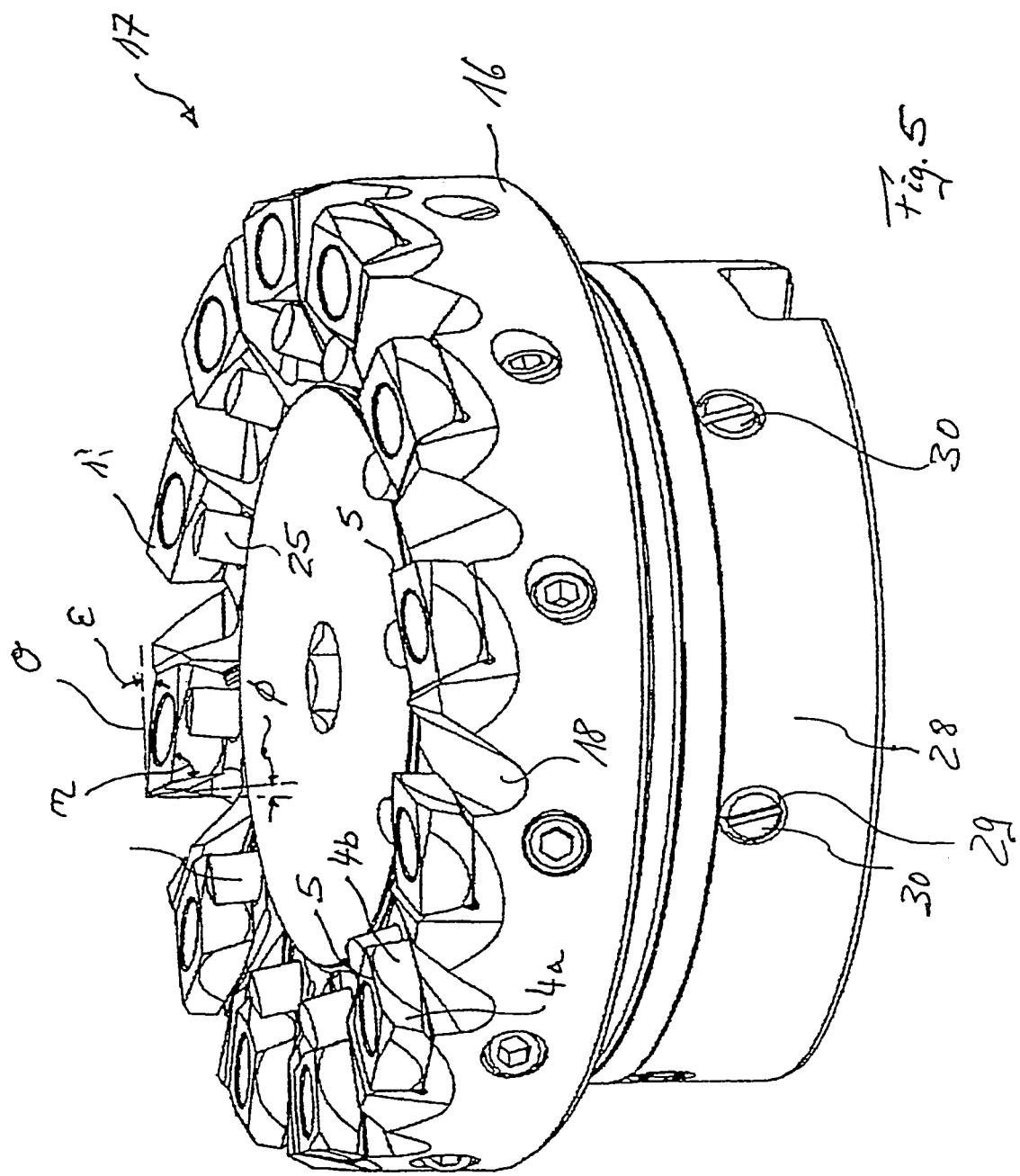
Figure 8:
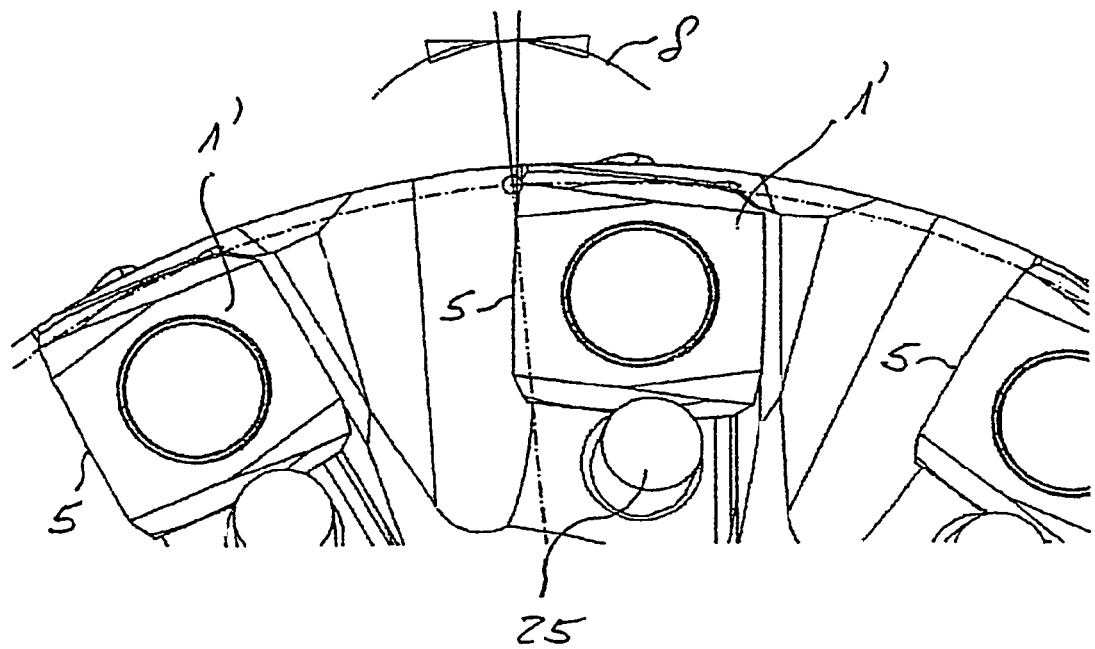
FIG. 8 shows the portion VIII in FIG. 6 drawn to a larger scale, FIG. 9, in a portion according to FIG. 8, shows a plate seat in the tool holder-milling head of the milling cutter.

In the milling cutter or finish-machining milling cutter 17 illustrated in FIG. 5 the optimal position of the indexable cutting inserts 1' in reference to the surface O that is to be machined is indicated when the adjusting angle γ=(0±1) degree and an angle of inclination δ=(−5±3) degrees is attained (FIG. 8). The value of the adjusting angle γ is determined primarily by the configuration of the surface portions 4a, 4b of the cutting insert 1' and, accordingly, upon the configuration of the cutting edge 5. The adjusting angle γ can vary in different types of the mentioned configuration of the surface portion 4a, 4b.

The finish-machining milling cutter 17 that according to FIG. 5 has a plurality of indexable cutting inserts 1' that are distributed disposed at the periphery of the milling head of the tool holder 16 comprises between adjacent indexable cutting inserts 1', chip depressions 18 for removal of chips that are generated in chip-forming treatment of a work piece or, respectively, of a surface O. The indexable cutting inserts 1' are arranged under a free angle ε=7 degrees, such that in conjunction with the angle α (FIG. 4) correspondingly a wedge angle η=77 degrees and a chip angle φ=6 degrees result.

Figure 6:
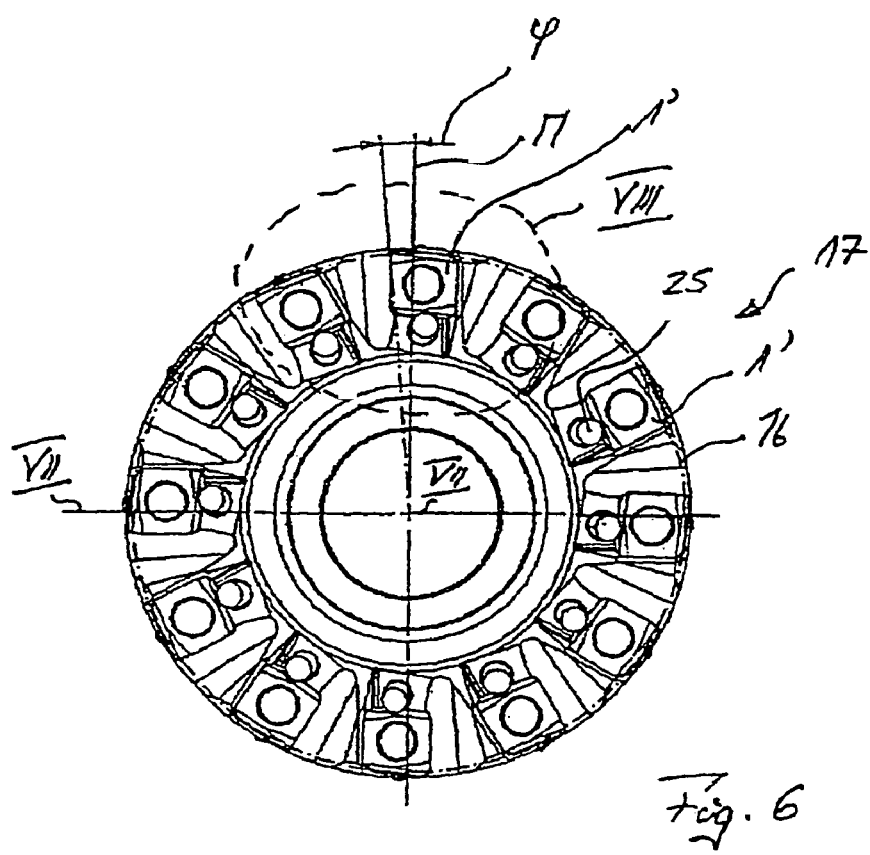
FIG. 6 shows a milling cutter in top plan view.

As is particularly clear from FIG. 6, the indexable cutting insert 1' that is provided in the region of the center line M of the tool holder 16, is arranged in such a way that it is disposed in the milling cutter 17 by an offset angle φ of φ equal (5±3) degrees anteriorly of the center line M. In conjunction with this offset of the respective indexable cutting insert 1', having the geometric configuration according to FIGS. 2 to 4, an increase of the radius of the ellipsoidal cutting edge 5 and thereby a particularly high surface finish quality upon chip-forming machining by means of milling cutter 17, are attained.

Due to the bulge configuration, i.e., the rounded cone mantle surface 4a of the respective lateral surface 4 of the cutting insert 1, 1' tolerances of the spindle that drives the tool holder 17 (should read 16) are compensated. This means, in turn, it is precluded that an edge of the cutting edge 5 is preferentially contacting the work piece, the surface O of which is to be machined. In addition, with this arrangement and this base configuration of the cutting insert 1' there is achieved a reduced, by a factor of one-half, waviness depth and profile depth, and, accordingly, an improvement, by a factor of 2, with respect to furrows and grooves of the surface O that is to be machined.

Within the milling cutter 17, the four cone-mantle-shaped surface portions that are disposed peripherally for each indexable cutting insert 1', the convex curvature of which produce the curving of the cutting edge 5, configure the chip surface of the main cutting edge and partially the free surface of the secondary cutting edge. However, these cone-mantle-shaped surface portions 4a do not comprise a function as contact surface in the plate seat 20 illustrated in FIG. 9.

Figure 7:
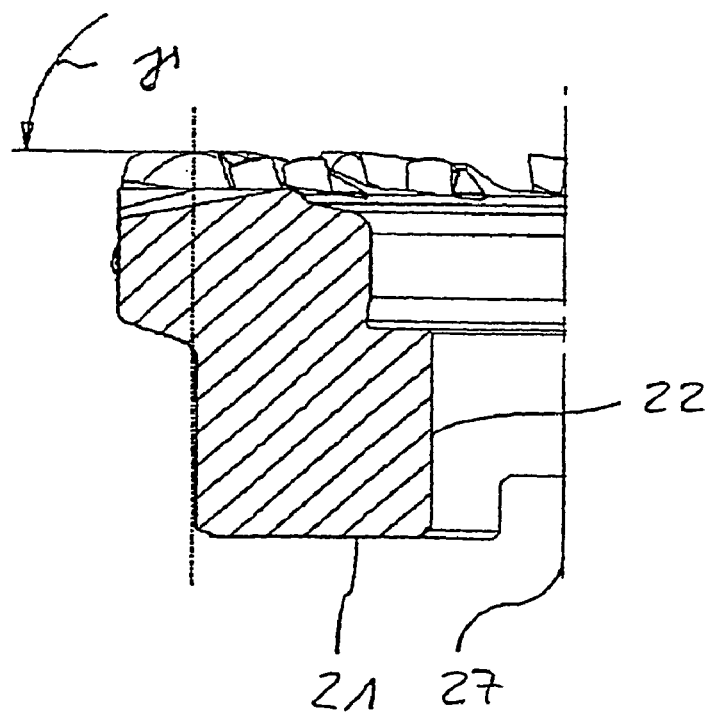
FIG. 7 shows a cross-sectional illustration of the milling cutter along line VII—VII in FIG. 6.

Special measures for ensuring the necessary exactness of the positioning of the cutting edge 5 are taken in the illustrated tool holder 16. The position of the cutting edge 5 in reference to the surface O that is to be machined, is primarily determined in the tool holder 16 by the position of the plate seat 20 in reference to the contact surface 21 and the take-up bore 22 of the tool holder 16 (FIG. 7).

A further determining factor is the geometric exactness of the reference surfaces, i.e., that of the support surface 23 that is disposed towards the corresponding base surface 3 and that of the contact surface 24 that is disposed towards the corresponding lateral surface 4, of the plate seat 20. The geometric configuration of the plate seat 20 as well as the precision with respect to the manufacture is in this adapted to a minimized deviation of the geometric parameters.

Figure 9:
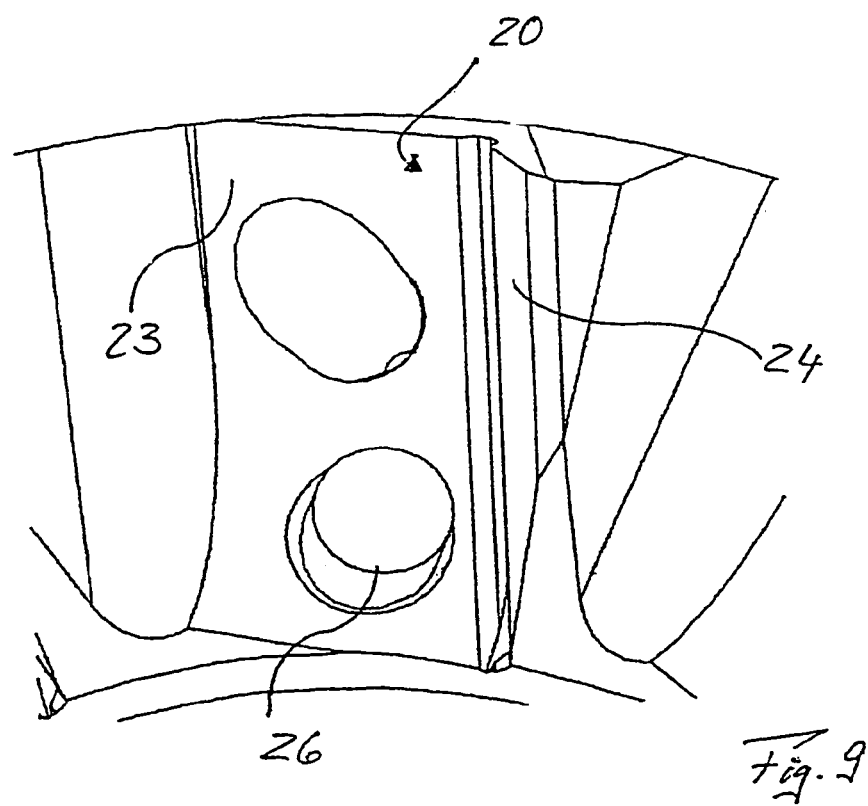

As is particularly evident from FIGS. 8 and 9, in the illustrated plate seat 20 a hardened steel pin 25 is used as an axial abutment for the indexable cutting insert 1'. For this, the plate seat 20 is provided in the region of the support surface 23 with a corresponding take-up opening 26 for this abutment pin 25. The abutment pin 25 is mounted only after machining of the support surface or base surface 23 and of the radial contact surface 24. Thereby, the configuration allows the machining of the support surface 23 as well as of the radial contact surface 24 in one operation. By proceeding in this manner it is ensured that a planar extent accuracy of 10 μm can be produced in the tool holder 16.

The rotational accuracy of the indexable cutting inserts 1' in reference to the axis of rotation 27 (FIG. 7) of the milling cutter 17 is predominantly determined by the axial position of the hardened abutment pin 25. Deviation from the axis of rotation 27 is to be very low.

As is illustrated in FIG. 5, the tool holder 16 comprises threaded bores 29 that are arranged peripherally at the tool collar 28, into which bores, as required, can be inserted particularly steel threaded pins 30 of different lengths, by way of screw threading. By means of these pins 30, the milling cutter 17 can be adjusted to a residual unbalance of G 6.3 at 10000 revolutions per minute (1/min). This affords a further improvement of the surface finish quality, since oscillations and vibrations are minimized during the machining. Such oscillations can be kept low by reducing the balance error of the milling cutter 17.

This leads consequently to a lowering of the free mass forces and thus to a lowering of the excursion of the tool under the influence thereof. This condition, in turn, has a positive effect upon the quality and grade of the surface O that is being machined and leads to a particularly low stressing of the drive spindle of the milling cutter machine, in which the milling cutter 17 is used.

The milling head or finish-machining cutter head of the tool holder 16 with the two-sided indexable cutting inserts 1' with respectively four cutting edges 5 for finish-machining operation has indexable cutting inserts 1' that are fixed as to position, whereby the position of the cutting edges 5 with respect to the surface O after fixing in place can no longer be varied. The respective indexable cutting insert 1' is connected to the tool holder 16 in such a way that the cutting edge 5 of the indexable cutting insert 1' is fixed in the predetermined position in suitable manner, such that a subsequent shifting of the cutting edge 5 is rendered impossible. This practically precludes a change of position of the indexable cutting insert 1' in reference to the tool holder 16 due to external influences.

Figure 10:
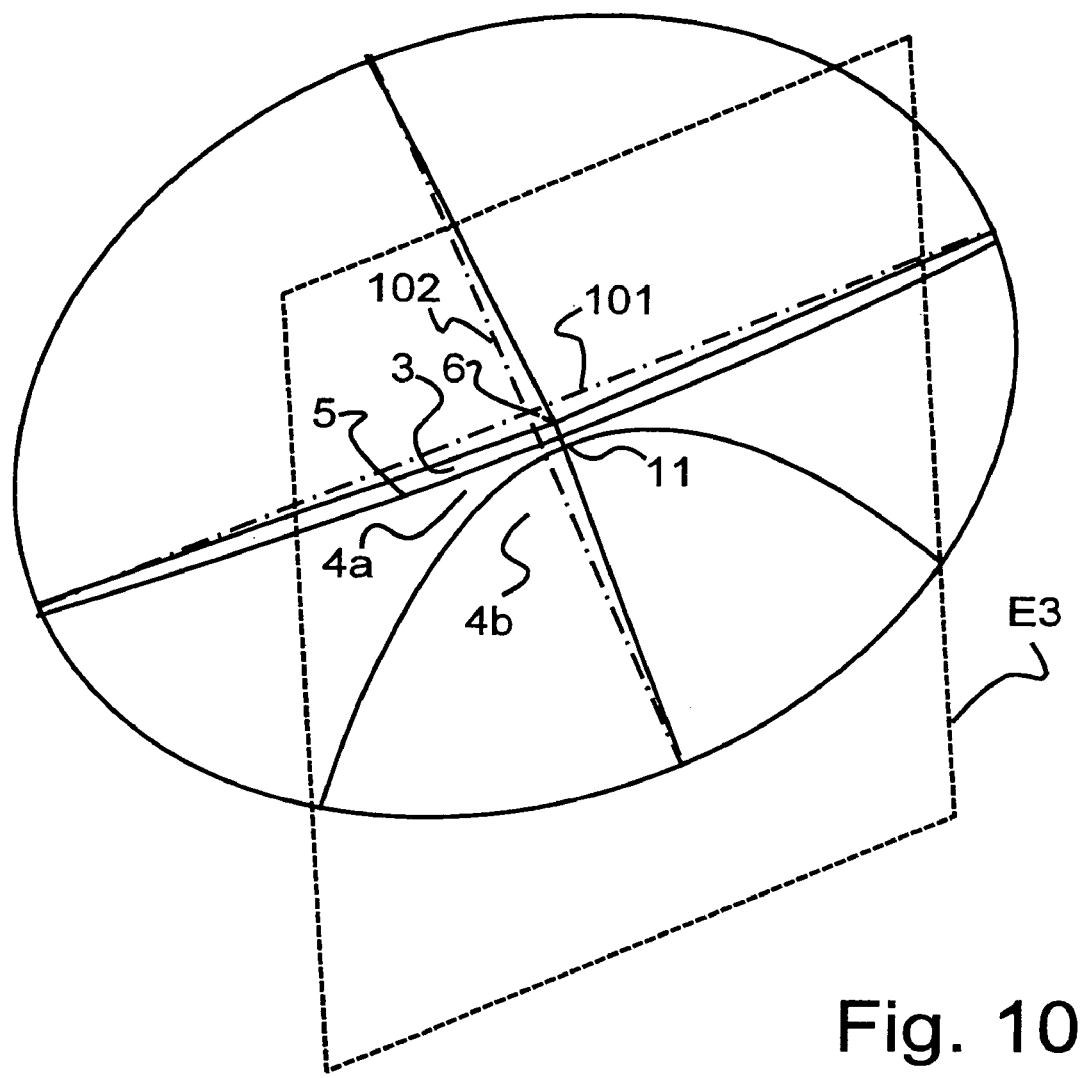
FIG. 10 shows a perspective view of a cone shape, such as could possibly be used to determine at least some of the surfaces and edges of a cutting insert according to at least one possible embodiment.

FIG. 10 shows a view of a cone which is representative of a cone shape that could possibly be used in at least one possible embodiment to define some of the edges and surfaces of the cutting insert. The cutting insert 1 is not shown, but some of the edges and surfaces thereof are shown to show how such edges and surfaces are formed as part of a cone. The diameter 101 of the cone is much greater than the axis 6 of the cone. Line 102 is substantially perpendicular to the diameter line 101, and both lines 101, 102 intersect at the center axis 6 of the cone. The cutting edge 5 is shown extended across the entire cone. The cutting edge 5 and line 101 together define a plane, which corresponds to the plane E1 of the planar plate 3 on the cutting insert. Plane E3 is the plane that cuts through the cone to define the planar surface 4b of the cutting insert, as indicated in the figure. Summit point 11 is shown and it is below the cone axis 6 in the same vertical plane. Cone-mantle-surface portion 4a is also shown. It should be understood that FIG. 10 shows where the parts of the cutting insert 1 may possibly be located in relationship to a cone according to one possible embodiment, and therefore should not be taken as limiting the embodiment or embodiments shown in the other figures of this application.

FIG. 11 shows a top view of a cone similar to the cone shown in FIG. 10 according to one possible embodiment. It should be understood that FIG. 11 shows where the parts of the cutting insert 1 may possibly be located in relationship to a cone according to one possible embodiment, and therefore should not be taken as limiting the embodiment or embodiments shown in the other figures of this application.

One feature or aspect of an embodiment is believed at the time of the filing of this patent application to possibly reside broadly in a cutting insert having opposite plate planes of a base body with respectively one base surface for each plane, as well as at least one lateral surface that has a cone-mantel-shaped surface portion and a planar surface portion, whereby the cone-mantel-shaped surface portion and the base surface that is facing this portion are disposed with respect to one another to form a cutting edge and at an acute angle, whereby the planar surface portion and the opposite base surface are disposed at an obtuse angle with respect to one another, and whereby the cone axis that is disposed in the plate plane of the cone-mantle-shaped surface portion extends in offset-parallel relationship with respect to the central axis that is disposed in the same plate plane with there being formed an off-center, curved portion of the cutting edge.

Another feature or aspect of an embodiment is believed at the time of the filing of this patent application to possibly reside broadly in the cutting insert, characterized in that the cutting edge has a curved course that is disposed in the plane of the base surface.

Yet another feature or aspect of an embodiment is believed at the time of the filing of this patent application to possibly reside broadly in the cutting insert, characterized in that an elliptically shaped course of curve of the cutting edge with edge segments that have different lengths and that commence at the cone axis.

Still another feature or aspect of an embodiment is believed at the time of the filing of this patent application to possibly reside broadly in the cutting insert, characterized in that an edge chamfer surface that respectively forms an obtuse angle with the planar surface portion as well as with the base surface that is facing away from the cutting edge.

A further feature or aspect of an embodiment is believed at the time of the filing of this patent application to possibly reside broadly in the cutting insert, characterized in that the edge chamfer surface is formed like a wedge.

Another feature or aspect of an embodiment is believed at the time of the filing of this patent application to possibly reside broadly in the cutting insert, characterized in that a first edge segment that extends from the summit point that is disposed beneath the cone axis to the edge chamfer surface, and a second edge segment that extends from the summit point to the edge terminus that is free of a chamfer surface, whereby the first edge segment is longer than the second edge segment.

Yet another feature or aspect of an embodiment is believed at the time of the filing of this patent application to possibly reside broadly in the cutting insert, characterized in that the cone-mantle-shaped surface portion and the planar surface portion are disposed at differing angles in such a way that an edge-of-cut that is configured by these two surface portions is disposed at the summit point towards the cutting edge.

Still another feature or aspect of an embodiment is believed at the time of the filing of this patent application to possibly reside broadly in the cutting insert, characterized in its configuration as reversible cutting insert with four lateral surfaces, whereby the cone-mantle-shaped surface portions and the planar surface portions of respectively oppositely disposed lateral surfaces are inclined with respect to one another.

A further feature or aspect of an embodiment is believed at the time of the filing of this patent application to possibly reside broadly in the cutting insert, characterized in respectively two edge chamfer surfaces that are disposed symmetrically to each base surface, each of which forms an obtuse angle with one base surface and one of the lateral surfaces, whereby the respective edge chamfer surface is disposed in an acute angle with respect to the cone-mantle-shaped surface portion of the adjacent lateral surface with formation of an ellipsoidal edge.

Another feature or aspect of an embodiment is believed at the time of the filing of this patent application to possibly reside broadly in the cutting insert, characterized in a rhomboid-shaped base body, the oppositely disposed base surfaces of which are turned with respect to one another by an angle smaller than 100 degrees and greater than 95 degrees, preferably 97 degrees.

Yet another feature or aspect of an embodiment is believed at the time of the filing of this patent application to possibly reside broadly in a milling tool with a plurality of cutting inserts that are disposed in distributed manner at the circumference of a tool holder.

Another feature or aspect of an embodiment is believed at the time of the filing of this patent application to possibly reside broadly in the milling tool, characterized in that a cutting insert disposed at the circumferential portion of the center line of the tool holder is offset by an angle of $\phi=(5\pm3)$ degrees with respect to the centerline.

Yet another feature or aspect of an embodiment is believed at the time of the filing of this patent application to possibly reside broadly in the milling tool, characterized in that to each cutting insert is provided a plate seat comprising a support surface that is facing the respective base surface and a contact surface that is facing a respective lateral surface, as well as a take-up opening for taking up of an abutment pin that is effective as an axial abutment for the cutting insert.

The components disclosed in the various publications, disclosed or incorporated by reference herein, may possibly be used in possible embodiments of the present invention, as well as equivalents thereof.

Some examples of silicon carbide, tungsten carbide, cemented carbide, and sintered carbide for use in cutting inserts that may possibly be utilized or adapted for use in at least one possible embodiment may possibly be found in the following U.S. Pat. No. 6,692,199, entitled "Cutting insert for grooving and profiling"; U.S. Pat. No. 6,682,274, entitled "Cutting insert with wear detection"; U.S. Pat. No. 6,682,273, entitled "Tool holder having a clamp plate for transmitting clamping forces from a clamping arm to a cutting insert"; U.S. Pat. No. 6,655,480, entitled "Cutting insert for percussion drill bit"; U.S. Pat. No. 6,634,837, entitled "Ceramic cutting insert of polycrystalline tungsten carbide"; U.S. Pat. No. 6,632,514, entitled "Coated cutting insert for milling and turning applications"; U.S. Pat. No. 6,612,787, entitled "Chromium-containing cemented tungsten carbide coated cutting insert"; U.S. Pat. No. 6,607,334, entitled "Cutting insert"; U.S. Pat. No. 6,607,333, entitled "Milling cutter and cutting insert therefor"; U.S. Pat. No. 6,543,970, entitled "Double negative cutting insert for tools for chip removing machining"; U.S. Pat. No. 6,503,028, entitled "Sintered cutting insert having center hole for clamp screw"; U.S. Pat. No. 6,454,498, entitled "Clamping arrangement including a holder blade and a keying arrangement for a cutting insert"; U.S. Pat. No. 6,447,219, entitled "Cutting insert for grooving"; U.S. Pat. No. 6,409,435, entitled "Cutting tool and method of locating cutting insert"; U.S. Pat. No. 6,394,709, entitled "Tool holder having a clamp plate for transmitting clamping forces from a clamp-ing arm to a cutting insert"; U.S. Pat. No. 6,379,087, entitled "Cutting insert with split face clamping surfaces and toolholder therefor"; U.S. Pat. No. 6,344,265, entitled "Coated cutting insert"; U.S. Pat. No. 6,343,898, entitled "Cutting insert and holder for metal cutting machining"; U.S. Pat. No. 6,341,923, entitled "Method and cutting insert for threading"; U.S. Pat. No. 6,333,098, entitled "Coated cutting insert"; U.S. Pat. No. 6,290,436, entitled "Cutting insert for rotating cutting tools"; U.S. Pat. No. 6,286,406, entitled "Injection molded carbide cutting insert"; U.S. Pat. No. 6,273,650, entitled "Cemented carbide cutting insert having integral structure for securing the insert in a holder"; U.S. Pat. No. 6,254,316, entitled "Cutting tool and cutting insert"; U.S. Pat. No. 6,244,791, entitled "Indexable cutting insert"; U.S. Pat. No. 6,241,430, entitled "Cutting insert having a chip former"; U.S. Pat. No. 6,238,147, entitled "Cutting insert for grooving"; U.S. Pat. No. 6,217,992, entitled "Coated cutting insert with a C porosity substrate having non-stratified surface binder enrichment"; U.S. Pat. No. 6,217,264, entitled "Cutting insert having an improved chip breaker"; U.S. Pat. No. 6,196,774, entitled "Cutting insert"; U.S. Pat. No. 6,196,770, entitled "Indexible cutting insert for end mills"; U.S. Pat. No. 6,190,096, entitled "Indexable cutting insert with indexing marks"; U.S. Pat. No. 6,171,031, entitled "Method for altering a cutting insert blank"; U.S. Pat. No. 6,170,368, entitled "Detachable chipbreaker for a cutting insert"; U.S. Pat. No. 6,168,356, entitled "Cutting insert and holder for metal cutting machining"; U.S. Pat. No. 6,161,990, entitled "Cutting insert with improved flank surface roughness and method of making the same"; U.S. Pat. No. 6,149,355, entitled "Ball nose end mill and a cutting insert for the ball nose end mill"; U.S. Pat. No. 6,146,061, entitled "Cutting insert and tool holder therefor"; U.S. Pat. No. 6,145,606, entitled "Cutting insert for roof drill bit"; U.S. Pat. No. 6,142,716, entitled "Tool and cutting insert for milling"; U.S. Pat. No. 6,138,540, entitled "Method and cutting insert for threading"; U.S. Pat. No. 6,135,678, entitled "Cutting insert for grooving operations"; U.S. Pat. No. 6,126,366, entitled "Cutting insert for chipbreaking machining of metals"; U.S. Pat. No. 6,123,488, entitled "Cutting insert with universal identification"; U.S. Pat. No. 6,116,824, entitled "Cutting insert for a milling cutter, and a method of preventing accidental dislodgement of cutting inserts"; U.S. Pat. No. 6,113,319, entitled "Cutting insert holder for turning operation"; U.S. Pat. No. 6,110,603, entitled "Hard-metal or cermet body, especially for use as a cutting insert"; U.S. Pat. No. 6,062,776, entitled "Coated cutting insert and method of making it"; U.S. Pat. No. 6,053,671, entitled "Metal cutting insert, and tool therefor, and method of mounting insert"; and U.S. Pat. No. 6,053,669, entitled "Chip forming cutting insert with internal cooling."

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of indexable cutting inserts which may possibly be utilized or adapted for use in at least one possible embodiment may possibly be found in the following U.S. patents: U.S. Pat. No. 6,676,339, entitled "Indexable cutting insert for machining workpieces;" U.S. Pat. No. 6,244,791, entitled "Indexable cutting insert;" U.S. Pat. No. 6,190,096, entitled "Indexable cutting insert with indexing marks;" U.S. Pat. No. 5,755,536, entitled "Indexable cutting insert;" U.S. Pat. No. 5,586,843, entitled "Indexable cutting insert for rotary cutting tools;" U.S. Pat. No. 5,368,418, entitled "Indexable cutting insert;" U.S. Pat. No. 5,085,542, entitled "Indexable cutting insert;" U.S. Pat. No. 5,044,840, entitled "Indexable cutting insert;" U.S. Pat. No. 5,035,546, entitled "Radiused on-edge indexable cutting insert;" U.S. Pat. No. 5,032,049, entitled "Indexable cutting insert;" U.S. Pat. No. 4,941,780, entitled "Indexable cutting insert;" U.S. Pat. No. 4,755,085, entitled "Indexable cutting insert;" U.S. Pat. No. 4,632,607, entitled "Indexable cutting insert;" U.S. Pat. No. 4,411,564, entitled "Indexable cutting insert having radiused cutting edges;" and U.S. Pat. No. 4,297,058, entitled "Indexable cutting insert."

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of cones and conical surfaces may be found in the following references which are incorporated by reference: "Solid Geometry" by P. M. Cohn, June 1968; "Plane and Solid Geometry with Technical Graphics" by D. Green, December 1985; "A Course in Geometry: Plane and Solid" by A. Weeks and J. Adkins, June 1982; "Groups and Geometry: Groups and Solids in Three Dimensions (M336 Groups and Geometry)" by D. Crowe, November, 2001; and "Computational Geometry on Surfaces: Performing Computational Geometry on the Cylinder, the Sphere, the Torus, and the Cone" by C. Grima and A. Marquez, November, 2001.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated, and/or cited elsewhere are hereby incorporated by reference as if set forth in their entirety herein as follows: EP 0 370 494 A, issued to Widia Heinlein GmbH on May 30, 1990; FR 2 364 724 A, issued to Walter GmbH Montanwerke on Apr. 14, 1978; DE 44 46 824 A, issued to Mitsubishi Materials Corp on Jun. 29, 1995; U.S. Pat. No. 5,513,931 A, issued to Reiterman Lee et al. on May 7, 1996; U.S. Pat. No. 5,256,009 A, issued to Stoffels Karl-Heinz on Oct. 26, 1993; and U.S. Pat. No. 5,368,418 A, issued to Bentjens Bernd et al. on Nov. 29, 1994.

The corresponding foreign and international patent publication applications, namely, Federal Republic of Germany Patent Application No. No. 201 14 783.1, filed on Sep. 6, 2001, having inventors Michael SCHUFFENHAUER, Steffen KRANZ, and Werner BOGUTH and DE-OS 201 14 783.1 and DE-PS 201 14 783.1; Federal Republic of Germany Patent Application No. No. 101 43 843.5, filed on Sep. 6, 2001, having inventors Michael SCHUFFENHAUER, Steffen KRANZ, and Werner BOGUTH and DE-OS 101 43 843.5 and DE-PS 101 43 843.5; and International Application No. PCT/EP02/09938, filed on Sep. 5, 2002, having WIPO Publication No. W003/022496 and inventors Michael SCHUFFENHAUER, Steffen KRANZ, and Werner BOGUTH, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of face milling cutters that may possibly be utilized or adapted for use in at least one possible embodiment may possibly be found in the following U.S.

Pat. No. 6,176,648, entitled "Face milling cutter and cutter body thereof;" U.S. Pat. No. 6,109,838, entitled "Face milling cutter and method of assembling;" U.S. Pat. No. 5,957,628, entitled "Face milling cutter or angular milling cutter;" U.S. Pat. No. 5,667,343, entitled "Face milling cutter with recesses for adjustable insert holders;" U.S. Pat. No. 5,542,795, entitled "Plunge and face milling cutter with universal insert seats;" U.S. Pat. No. 5,454,670, entitled "Throw-away insert and face milling cutter;" U.S. Pat. No. 5,451,122, entitled "Chip collector and face milling cutter;" U.S. Pat. No. 4,995,767, entitled "Face milling cutter with indexable inserts;" U.S. Pat. No. 4,966,500, entitled "Face milling cutter with cutter inserts;" U.S. Pat. No. 4,826,363, entitled "Face-milling cutter for a planer;" U.S. Pat. No. 4,765,783, entitled "Face milling cutter;" U.S. Pat. No. 4,586,855, entitled "Face milling cutter;" U.S. Pat. No. 4,352,609, entitled "Face milling cutter;" U.S. Pat. No. 4,197,038, entitled "Face milling cutter head with rod-shaped cutters;" and U.S. Pat. No. 4,194,860, entitled "Face milling cutter."

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of milling cutters with indexable cutting inserts that may possibly be utilized or adapted for use in at least one possible embodiment may possibly be found in the following U.S. patents: U.S. Pat. No. 6,374,712, entitled "Disk milling cutter and suitable indexable insert;" U.S. Pat. No. 5,707,185, entitled "Indexable insert for milling and milling cutter employing the same;" U.S. Pat. No. 5,542,794, entitled "Multi-handed milling cutter having indexable wedges and inserts;" U.S. Pat. No. 5,454,671, entitled "Indexable insert for face or disc milling cutters, and a cutter using said insert;" U.S. Pat. No. 5,145,294, entitled "Milling cutter capable of using indexable inserts of various shapes;" U.S. Pat. No. 4,995,767, entitled "Face milling cutter with indexable inserts;" U.S. Pat. No. 4,940,369, entitled "Milling cutter with indexable inserts;" U.S. Pat. No. 4,844,643, entitled "Boring and milling tool and indexable cutter bit insert for use therein;" U.S. Pat. No. 4,812,087, entitled "End mill cutting tool and indexable insert therefor;" U.S. Pat. No. 4,681,485, entitled "End mill cutting tool and indexable insert therefor;" U.S. Pat. No. 4,522,538, entitled "Milling cutter with multiple indexable cutting inserts;" U.S. Pat. No. 4,294,565, entitled "Indexable finishing insert for a milling cutter;" and U.S. Pat. No. 4,182,587, entitled "Milling cutter and indexable insert."

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

Index of Reference Numerals
1 cutting insert
1' reversible/indexable cutting insert
2 base body
3 base surface
4 lateral surface
4a,b surface portion
5 cutting edge
6 cone axis
7 plate axis
8 edge
9 edge chamfer surface
10 edge
11 summit point
14 edge
15 opening
16 tool holder
17 milling tool/milling to smooth finish
18 chip depression
20 plate seat
21 contact surface
22 take-up bore
23 support surface
24 contact surface
25 abutment pin
26 take-up opening
27 axis of rotation
28 tool collar
29 threaded bore
30 threaded pin
E1,2 plate plane
M center line
O surface
d distance of separation
$\alpha, \eta$ acute/wedge angle
$\beta$ obtuse angle γ adjusting angle
δ angle of inclination
ε free angle
φ chip angle
Φ offset angle

What is claimed is:

1. A cutting insert, comprising:
   a base body including a first base surface and a second opposing base surface;
   at least one lateral surface extending between the first and second base surfaces, said at least one lateral surface including a cone-mantel-shaped portion extending from said first base surface and forming an acute angle therewith, and a planar surface portion extending from said second base surface and forming an obtuse angle therewith, the cone-mantel-shaped portion and the planar surface portion forming an arcuate-shaped edge therebetween;
   at least one edge chamfer surface disposed between said first base surface and said planar surface portion; and
   at least one cutting edge formed at an intersection between the cone-mantel-shaped portion and said first base surface, said at least one cutting edge having a radius of curvature, R, defined by a cone axis that is parallel offset by a distance with respect to a central axis of the cutting insert.

2. A cutting insert according to claim 1, wherein the arcuate-shaped edge defines a summit point that is coplanar with the cone axis.

3. A cutting insert according to claim 2, wherein the at least one cutting edge comprises a first cutting edge and a second cutting edge.

4. A cutting insert according to claim 3, wherein the first and second cutting edges have different lengths.

5. A cutting insert according to claim 1, wherein the at least one edge chamfer surface forms an obtuse angle with respect to the planar surface portion and the first base surface.

6. A cutting insert according to claim 1, wherein said cutting insert is indexable comprising four lateral surfaces, whereby the cone-mantel-shaped surface portions and the planar surface portions of respectively oppositely disposed lateral surfaces are inclined with respect to each another.

7. A cutting insert according to claim 6, further comprising two edge chamfer surfaces disposed symmetrically with respect to said first and second base surfaces, wherein each edge chamfer surface forms an obtuse angle with respect to a respective base surface and one of the lateral surfaces, and wherein each edge chamfer surface is disposed at an acute angle with respect to a cone-mantel-shaped surface portion of an adjacent lateral surface.

8. A cutting insert according to claim 1, wherein said base body is rhomboid-shaped in which said first and second base surfaces are turned with respect to one another by an angle smaller than 100 degrees and greater than 95 degrees.

9. A cutting tool, comprising:
   a tool holder; and
   a plurality of inserts distributed around a circumference of said tool holder, at least one insert comprising a base body including a first base surface and a second opposing base surface, at least one lateral surface extending between the first and second base surfaces, said at least one lateral surface including a cone-mantel-shaped portion extending from said first base surface and forming an acute angle therewith, and a planar surface portion extending from said second base surface and forming an obtuse angle therewith, the cone-mantel-shaped portion and the planar surface portion forming an arcuate-shaped edge therebetween, at least one edge chamfer surface disposed between said first base surface and said planar surface portion, and at least one cutting edge formed at an intersection between the cone-mantel-shaped portion and said first base surface, said at least one cutting edge having a radius of curvature, R, defined by a cone axis that is parallel offset by a distance with respect to a central axis of the cutting insert.

10. A cutting tool according to claim 9, wherein the at least one cutting insert is offset by an angle of $\Phi=(5\pm3)$ degrees with respect to a centerline of said toolholder.

11. A cutting tool according to claim 10, wherein each cutting insert includes a plate seat comprising a support surface that is facing one a respective base surface and a contact surface that is facing a respective lateral surface, and further comprising a take-up opening for taking up of an abutment pin that is effective as an axial abutment for the cutting insert.

12. A cutting tool according to claim 9, wherein the arcuate-shaped edge defines a summit point that is coplanar with the cone axis.

13. A cutting tool according to claim 12, wherein the at least one cutting edge comprises a first cutting edge and a second cutting edge.

14. A cutting tool according to claim 13, wherein the first and second cutting edges have different lengths.

15. A cutting insert according to claim 9, wherein the at least one edge chamfer surface forms an obtuse angle with respect to the planar surface portion and with the first base surface.

16. A cutting insert according to claim 9, wherein said at least one cutting insert is indexable and comprises four lateral surfaces, whereby the cone-mantel-shaped surface portions and the planar surface portions of respectively oppositely disposed lateral surfaces are inclined with respect to each another.

17. A cutting insert according to claim 16, wherein said at least one cutting insert further comprises two edge chamfer surfaces disposed symmetrically with respect to said first and second base surfaces, wherein each edge chamfer surface forms an obtuse angle with respect to a respective base surface and one of the lateral surfaces, and wherein each edge chamfer surface is disposed at an acute angle with respect to a cone-mantel-shaped surface portion of an adjacent lateral surface.

18. A cutting insert according to claim 9, wherein said base body is rhomboid-shaped in which said first and second base surfaces are turned with respect to one another by an angle smaller than 100 degrees and greater than 95 degrees.

* * * * *